E. A. SUTCLIFFE.

Breech-Loading Ordnance.

No. 5,375. Reissued April 22, 1873.

Witnesses

Chas. P. Smith

Geo. T. Pinckney

Inventor

Elihu A. Sutcliffe

Lemuel W. Serrell

Att'y.

AM. PHOTO-LITHOGRAPHIC CO. N.Y. (OSBORNE'S PROCESS.)

UNITED STATES PATENT OFFICE.

ELIHU A. SUTCLIFFE, OF NEW YORK, N. Y.

IMPROVEMENT IN BREECH-LOADING ORDNANCE.

Specification forming part of Letters Patent No. 39,596, dated August 18, 1863; reissue No. 5,375, dated April 22, 1873; application filed February 11, 1873.

*To all whom it may concern:*

Be it known that I, ELIHU A. SUTCLIFFE, of the city and State of New York, have invented an Improvement in Breech-Loading Ordnance, of which the following is a specification:

Before this invention a gun had been made with the bore extending entirely through, and made with a screw at the end, and a cross-mortise. The present invention consists in a gun made with an opening through the breech, a mortise or opening at right angles, or nearly so, to the axis of the gun, and a breech-stopper that is moved within such mortise to cover or uncover the rear end of the bore or powder-chamber.

Figure 1:
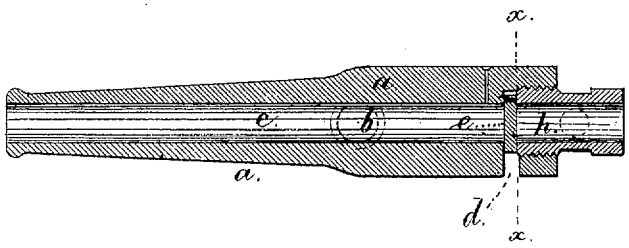
Figure 2:
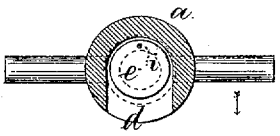
Figure 3:
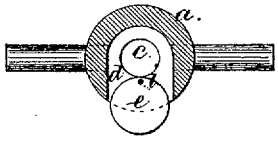

In the drawing, Figure 1 is a longitudinal section of a cannon with my improvement applied thereto. Fig. 2 is a cross-section at the line *x x* with the breech closed; and Fig. 3 is a similar section with the breech open.

The cannon *a* is of any desired size or shape. *b b* represent the trunnions; *c*, the bore or caliber of the gun. *d* is a mortise or recess passing off at right angles, or nearly so, to the bore of the gun, within which the breech-stopper *e* is moved to cover or uncover the rear end of the powder-chamber or bore of the gun. This breech-stopper *e* is slightly larger than the bore of the gun, so that when in place, and pressed forward from behind, the surface of the breech-stopper shall be in contact with the annular position of the surface of the mortise around the bore, thereby making the joint gas-tight; and the breech-stopper is to be pressed forward by mechanism that is sufficiently strong to withstand the force of the explosion.

It is to be understood that when the breech-stopper *e* is moved laterally into the mortise so as to uncover the rear end of the bore, the cartridge can be inserted from the rear, the gun being open from end to end.

As a means for supporting the laterally-moving breech-stopper, I prefer and have shown, the hollow breech-screw *h*, that is provided with a suitable lever or handle, by which it is revolved; and the opening through this breech-screw is the same size, or slightly larger, than the bore of the gun, so as to admit the cartridge to pass freely. The breech of the gun is bored out larger than the caliber of the gun, and of sufficient size to receive this breech-screw, and the necessary screw-thread is made for the same. The pin *i* serves to connect the breech-stopper with the breech-screw; and, as the breech-screw is partially revolved, this pin acts like a crank to give a lateral motion to the breech-stopper, and cause the same to cover or uncover the breech. The screw itself clamps the stopper firmly to the rear of the bore, and makes a tight joint. When the breech-stopper is being moved against one side of the mortise it is partially revolved, and hence is moved with great facility.

I claim as my invention—

1. A circular breech-stopper, moving laterally, in combination with mechanism, substantially as specified, for giving such movement in opening and closing the breech.

2. The tubular breech-screw *h* and pin *i*, in combination with the breech-stopper *e* within the lateral mortise of the gun, substantially as specified.

Signed by me this 5th day of February, A. D. 1873.

ELIHU A. SUTCLIFFE.

Witnesses:
GEO. T. PINCKNEY,
CHAS. H. SMITH.